United States Patent
Kang et al.

(10) Patent No.: US 9,237,635 B2
(45) Date of Patent: Jan. 12, 2016

(54) INTELLIGENT LIGHTING CONTROL APPARATUS AND METHOD

(71) Applicant: ELECTRONICS AND TELECOMMUNICATIONS RESEARCH INSTITUTE, Daejeon (KR)

(72) Inventors: Hyun-Chul Kang, Daejeon (KR); Tae-Gyu Kang, Daejeon (KR); Hyun-Seok Kim, Daejeon (KR); Jung-Sik Sung, Daejeon (KR); Hyun-Joo Kang, Daejeon (KR); Seong-Hee Park, Daejeon (KR); Sang-Kyu Lim, Daejeon (KR); Il-Soon Jang, Daejeon (KR); You-Jin Kim, Daejeon (KR); Dae-Ho Kim, Daejeon (KR); In-Su Kim, Daejeon (KR); Myung-Soon Kim, Daejeon (KR); Jin-Doo Jeong, Daejeon (KR); Hyun-Jong Kim, Chungcheongbuk-do (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 14/157,077

(22) Filed: Jan. 16, 2014

(65) Prior Publication Data

US 2014/0292209 A1    Oct. 2, 2014

(30) Foreign Application Priority Data

Apr. 1, 2013    (KR) .................. 10-2013-0035204

(51) Int. Cl.
H05B 37/02    (2006.01)

(52) U.S. Cl.
CPC ............ *H05B 37/0245* (2013.01); *Y02B 20/48* (2013.01)

(58) Field of Classification Search
CPC .. H05B 37/02; H05B 37/029; H05B 37/0236; H05B 37/0245; H05B 37/0227; H05B 33/081; H05B 37/0272; H05B 33/085453; Y02B 20/48; Y02B 20/44; Y02B 20/46; Y02B 20/42
USPC ......... 315/307, 312, 318, 149, 152, 292–294, 315/297, 155
See application file for complete search history.

(56) References Cited

U.S. PATENT DOCUMENTS

| 8,035,320 B2* | 10/2011 | Sibert ........................ 315/312 |
| 8,362,713 B2* | 1/2013 | Recker ............... H05B 33/0803 307/44 |

(Continued)

FOREIGN PATENT DOCUMENTS

| KR | 10-2011-0061943 A | 6/2011 |
| KR | 10-2012-0037089 A | 4/2012 |

(Continued)

*Primary Examiner* — Haissa Philogene
(74) *Attorney, Agent, or Firm* — Rabin & Berdo, P.C.

(57) ABSTRACT

The present invention relates to an intelligent lighting control apparatus and method, which control an intelligent lighting unit including multiple sensors depending on time, place, scene, environment, or the like, based on the results of sensing by the sensors. The intelligent lighting control apparatus includes a multi-sensor unit including multiple sensors, the multi-sensor unit sensing motion of a person or an object within a set sensing area using at least one of the multiple sensors. A lighting control unit controls an operation of a lighting unit based on frequency data corresponding to results of sensing by the multi-sensor unit and a class of lighting type corresponding to the frequency data.

10 Claims, 9 Drawing Sheets

(56) References Cited

U.S. PATENT DOCUMENTS 8,796,935 B2 * 8/2014 Ferren .......................... 315/152
8,866,392 B2 * 10/2014 Chen ............................ 315/152

FOREIGN PATENT DOCUMENTS

KR   10-2013-0015103 A   2/2013
KR   10-1234176 A         2/2013

* cited by examiner

INTELLIGENT LIGHTING CONTROL APPARATUS AND METHOD

CROSS REFERENCE TO RELATED APPLICATION

This application claims the benefit of Korean Patent Application No. 10-2013-0035204, filed on Apr. 1, 2013, which is hereby incorporated by reference in its entirety into this application.

BACKGROUND OF THE INVENTION

1. Technical Field

The present invention relates generally to an intelligent lighting control apparatus and method and, more particularly, to an intelligent lighting control apparatus and method, which control an intelligent lighting unit including multiple sensors depending on time, place, scene, environment, or the like, based on the results of sensing by the sensors.

2. Description of the Related Art

Domestic and foreign lighting equipment companies efficiently and intelligently control lighting using a variety of sensors. Here, sensors are independent components operated separately from lighting equipment. Such a lighting control method requires a separate communication scheme to collect and combine information sensed by the sensors, and has difficulty in managing such sensing information in an integrated manner.

For example, Korean Patent No. 1234176 discloses technology for controlling lighting using information sensed by echo sensors for sensing the environment of surroundings around lighting equipment.

Further, Korean Patent Application Publication No. 2013-0015103 discloses technology for controlling bathroom lighting in which noncontact switches for generating electrical signals are installed so that various functions are performed due to the motion of a user as sensed by an infrared sensor, or sounds produced by the user and sensed by an acoustic sensor.

In this way, conventional technologies for controlling lighting are configured to control lighting using only information sensed by sensors, that is, raw data, so that lighting equipment is sensitive to a variation in scene and the probability of the lighting equipment malfunctioning is increased, and thus there is a problem in that the user may feel annoyed.

When lighting is controlled using raw data of a human body detection sensor that utilizes pyroelectricity, ON/OFF operations of lighting are controlled using only the raw data of the human body detection sensor, thus encountering the problem of error rate increasing in a direction toward the border of a sensing area. Further, there is a disadvantage in that, even when a person is not present, malfunctioning may occur due to a variation in surrounding brightness or the like, and energy waste and annoyance attributable to such malfunctioning may also occur.

SUMMARY OF THE INVENTION

Accordingly, the present invention has been made keeping in mind the above problems occurring in the prior art, and an object of the present invention is to provide an intelligent lighting control apparatus and method, which control an intelligent lighting unit including multiple sensors depending on time, place, scene, environment, or the like, based on the results of sensing by the sensors.

In accordance with an aspect of the present invention to accomplish the above object, there is provided an intelligent lighting control method including sensing, by an intelligent lighting control apparatus including multiple sensors, motion of a person or an object within a set sensing area using the multiple sensors; converting results of sensing into valid data, and calculating frequency data using the valid data; calculating a class of lighting type based on the valid data; and controlling an operation of a lighting unit based on a class of lighting type corresponding to the frequency data.

Preferably, the multiple sensors may include at least one of an illuminance sensor, a temperature sensor, an awareness sensor, a color temperature sensor, and a voice sensor.

Preferably, calculating the class of lighting type may include calculating dimming levels and dimming periods for respective times, days of a week, holidays, dates, and scenes based on the valid data; and calculating the class of lighting type based on the dimming levels and the dimming periods.

Preferably, calculating the frequency data may include collecting raw data using the results of the sensing; extracting sensor information from the raw data; and converting the sensor information into the valid data.

Preferably, controlling the operation of the lighting unit may be configured to control the operation of the lighting unit using an electricity saving lighting coefficient, a lighting environment lighting coefficient, or a life pattern lighting coefficient depending on the class of lighting type.

In accordance with another aspect of the present invention to accomplish the above object, there is provided an intelligent lighting control apparatus including a multi-sensor unit including multiple sensors, the multi-sensor unit sensing motion of a person or an object within a set sensing area using at least one of the multiple sensors; and a lighting control unit for controlling an operation of a lighting unit based on frequency data corresponding to results of sensing by the multi-sensor unit and a class of lighting type corresponding to the frequency data.

Preferably, the multi-sensor unit may include a sensor unit including at least one of an awareness sensor, a temperature sensor, an illuminance sensor, a color temperature sensor, and a voice sensor; a signal processing unit for converting results of sensing by the sensor unit into a sensing signal; a sensor data detection unit for collecting raw data based on the sensing signal, extracting sensor information from the raw data, and converting the sensor information into valid data; a sensor data analysis unit for selecting a sensor control algorithm based on the valid data; and a sensor control unit for controlling the sensor unit based on the sensor information and the sensor control algorithm.

Preferably, the sensor information may include Identifications (IDs), dates, times, and measurements of the sensors, ID of a sensor group including a corresponding sensor, and types, states, and installation places of the sensors.

Preferably, the lighting control unit may control the operation of the lighting unit using an electricity saving lighting coefficient, a lighting environment lighting coefficient, or a life pattern lighting coefficient depending on the class of lighting type.

Preferably, the lighting control unit may be configured to, when the electricity saving lighting coefficient is used, generate a lighting dimming signal, a lighting ON signal, and a lighting OFF signal based on the electricity saving lighting coefficient, and control the operation of the lighting unit in response to the generated signals.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
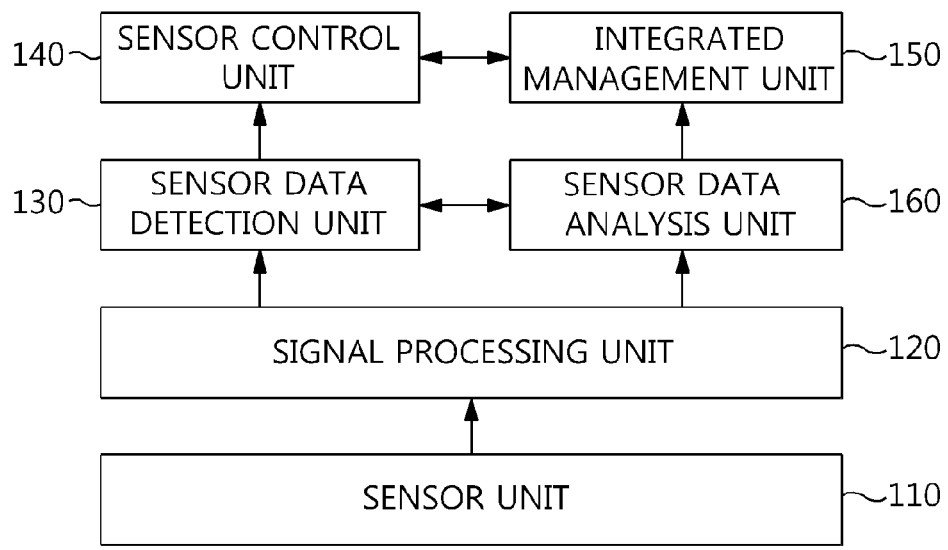
FIG. 1 is a configuration diagram schematically showing a multi-sensor unit according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, an intelligent lighting control apparatus and method according to preferred embodiments of the present invention will be described in detail with reference to the attached drawings.

FIG. 1 is a configuration diagram schematically showing a multi-sensor unit according to an embodiment of the present invention.

First, a multi-sensor unit 100 according to an embodiment of the present invention may be operated with the multi-sensor unit 100 contained in a lighting unit or may be operated in conjunction with the lighting unit in an independent form in which the multi-sensor unit 100 is separated from the lighting unit.

Referring to FIG. 1, the multi-sensor unit 100 includes a sensor unit 110, a signal processing unit 120, a sensor data detection unit 130, a sensor control unit 140, an integrated management unit 150, and a sensor data analysis unit 160.

The sensor unit 110 includes, for example, an illuminance sensor, a temperature sensor, an awareness sensor, a color temperature sensor, a voice sensor, etc. Here, the awareness sensor corresponds to a sensor that uses thermal infrared rays, microwaves, a camera, etc.

As described above, the sensor unit 110 includes multiple sensors, that is, a plurality of sensors, and may enable sensors to be added to or subtracted from the sensor unit 110 depending on the user's definition.

The signal processing unit 120 converts sensing results from the sensor unit 110 into a sensing signal. For example, the signal processing unit 120 detects sensing results corresponding to the results of sensing a specific measurement target using the multiple sensors, that is, the absolute value of a physical quantity or a variation in the physical quantity, and generates the sensing signal.

The sensor data detection unit 130 collects pieces of raw data in response to the sensing signal, extracts sensor information from the collected raw data, and converts the extracted sensor information into valid data. Here, the sensor information extracted from the raw data includes information extracted by the sensors included in the sensor unit 110, that is, Identifications (IDs), dates, times, and measurements of the sensors, the ID of a sensor group including the corresponding sensor, the types, states, and installation places of the sensors, etc. Further, the sensor data detection unit 130 may add the sensor information to the valid data depending on the user's definition while converting the sensor information into the valid data.

The sensor control unit 140 controls the sensors included in the sensor unit 110 based on the sensor information extracted by the sensor data detection unit 130, or a sensor control algorithm. In this way, the sensor control unit 140 may optimize and control lighting in a customized form by controlling the sensors based on the extracted sensor information.

For example, when the sensor unit 110 is assumed to include an awareness sensor, a temperature sensor, an illuminance sensor, a color temperature sensor, and a voice sensor, the sensor control unit 140 may control the illuminance sensor, the color temperature sensor, and the voice sensor depending on specific scenes. In this case, the sensor control unit 140 uses a sensor control signal required to control the corresponding sensor depending on the specific scenes.

Further, the sensor control unit 140 may transfer the extracted sensor information in conjunction with an external or internal device.

The integrated management unit 150 manages the multiple sensors present in the sensor unit 110.

In detail, the integrated management unit 150 may register, change or delete the corresponding sensor in response to the sensor control signal output from the sensor control unit 140. Further, the integrated management unit 150 may group the sensors included in the sensor unit 110 and manage the grouped sensors in an integrated manner. The integrated management unit 150 may set a data threshold which is a basis for the extraction of set data and measurement data of the sensors. The integrated management unit 150 manages the multiple sensors present in the sensor unit 110 so that the multiple sensors are mapped to corresponding external and internal parts or interfaces in correspondence with the parts or the interfaces.

When each of external and internal parts or interfaces requests sensor information, the integrated management unit 150 also supports the function of processing data in conjunction with the sensors in an integrated manner so as to provide multi-sensor data.

The sensor data analysis unit 160 selects a sensor control algorithm based on the valid data output from the sensor data detection unit 130, and generates sensor-integrated metadata. Here, the sensor control algorithm may be variously added by a user. Further, the valid data may be configured in various ways to include the results of sensing by the sensors included in the sensor unit 110, that is, sensing signals.

In this way, the present invention may optimize lighting in conformity with purposes, such as temporal and spatial purposes, using the multi-sensor unit 100, and may control lighting in a customized form depending on the purposes. Further, the present invention may maximize energy saving by controlling lighting via the multi-sensor unit 100.

Next, an intelligent lighting control apparatus including the multi-sensor unit 100 of FIG. 1 will be described in detail with reference to FIG. 2.

Figure 2:
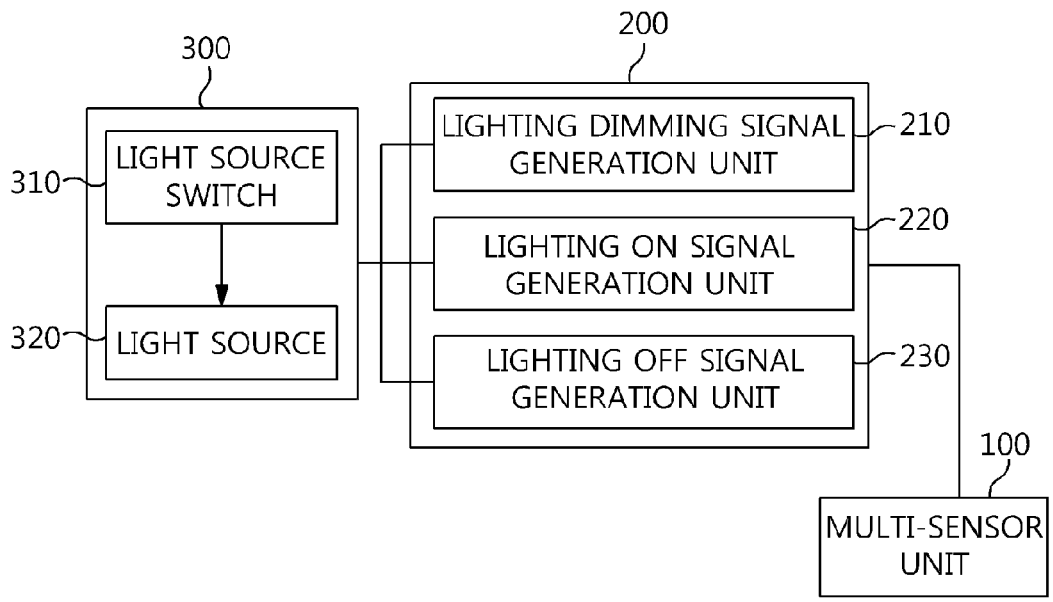
FIG. 2 is a configuration diagram showing an intelligent lighting control apparatus according to an embodiment of the present invention.

FIG. 2 is a configuration diagram showing an intelligent lighting control apparatus according to an embodiment of the present invention.

Referring to FIG. 2, the intelligent lighting control apparatus includes a multi-sensor unit 100, a lighting control unit 200, and a lighting unit 300.

The sensor unit 110 of the multi-sensor unit 100 is assumed to include an illuminance sensor and an awareness sensor.

The lighting control unit 200 generates a lighting control signal using the number of detections corresponding to the valid data of the multi-sensor unit 100.

In detail, the lighting control unit 200 accumulates the number of generations of a detection signal using the valid data of the multi-sensor unit 100 and a time clock, and calculates the class of lighting type using the cumulative number of generations. In this case, the number of generations denotes the number of times that the motion of a person or an object is detected using the awareness sensor of the multi-sensor unit 100.

Figure 3:
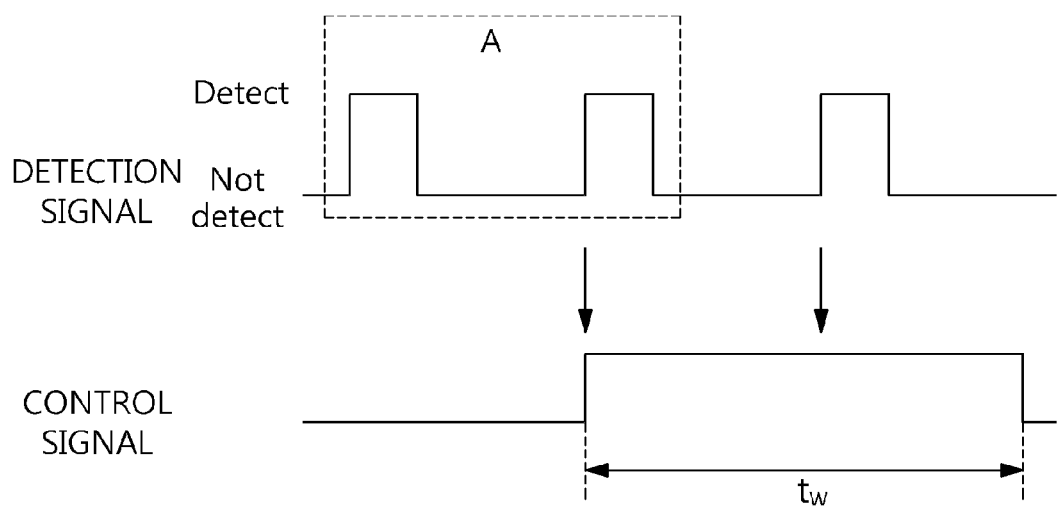
FIG. 3 is a reference diagram showing the conditions of generation of a control signal according to an embodiment of the present invention.

For example, when, as shown in FIG. 3, the number of generations of a detection signal reaches the preset number of times (in FIG. 2, the preset number of times is 2), the lighting control unit 200 controls lighting in response to a control signal for a preset period $t_w$. Tuning parameters applied to FIG. 3 include a basic model and an improved model. Here, the basic model includes a window size (=time), a detection signal for ON determination, and a duration $t_w$. The improved model includes surrounding factors (for example, illuminance and temperature) and a pyroelectric threshold voltage.

Further, the lighting control unit 200 generates lighting control signals based on the calculated classes of lighting type. In this case, the lighting control signals include a lighting dimming signal, a lighting ON signal, and a lighting OFF signal. Here, the classes of lighting type according to the embodiment of the present invention denote classes obtained by calculating dimming levels and dimming periods for respective times, days of the week, holidays, dates, and scenes and classifying the dimming levels and the dimming periods so that specific lighting coefficients can be applied to the classes in various environments.

In this way, in order to generate the lighting control signals, the lighting control unit 200 includes a lighting dimming signal generation unit 210, a lighting ON signal generation unit 220, and a lighting OFF signal generation unit 230.

The lighting dimming signal generation unit 210 generates a lighting dimming signal required to control the lighting unit 300 so that the brightness of the lighting unit 300 is adjusted and then a comfortable environment may be created.

The lighting ON signal generation unit 220 generates a lighting ON signal required to control the lighting unit 300 so that the lighting unit 300 is turned on.

The lighting OFF signal generation unit 230 generates a lighting OFF signal required to control the lighting unit 300 so that the lighting unit 300 is turned off.

The lighting unit 300 includes a light source switch 310 and a light source 320.

The light source switch 310 controls the light source 320 using a switch button, a wireless ON signal, or a scheduler ON signal in response to the lighting control signal generated by the lighting control unit 200.

Hereinafter, an intelligent lighting control method will be described in detail with reference to FIG. 4.

Figure 4:
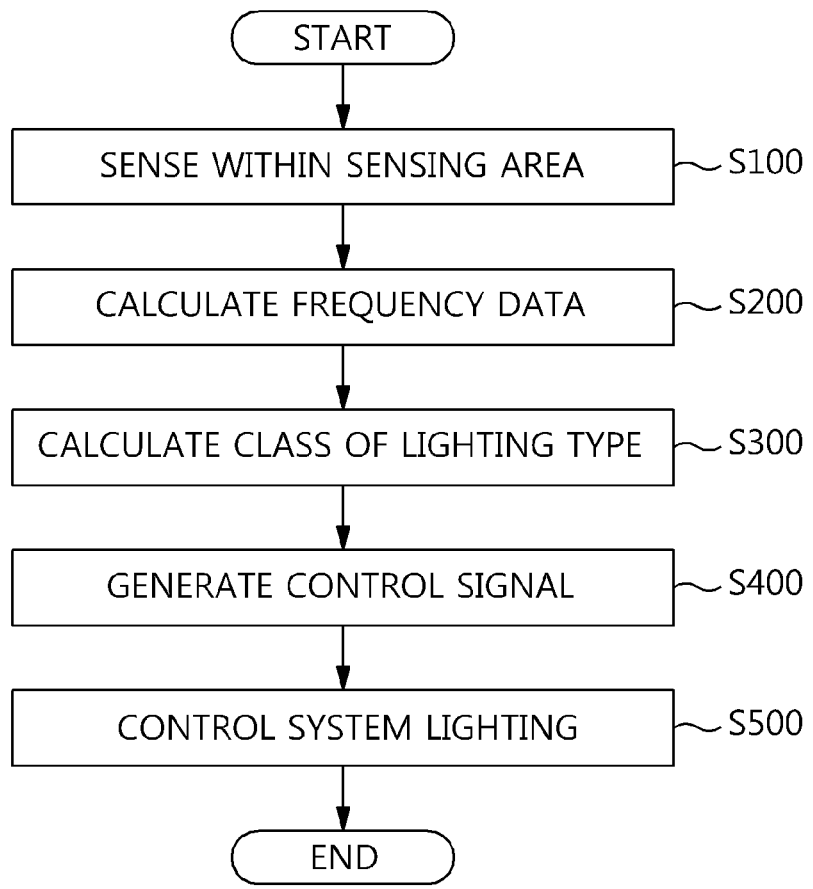
FIG. 4 is a flowchart showing an intelligent lighting control method according to an embodiment of the present invention.

FIG. 4 is a flowchart showing an intelligent lighting control method according to an embodiment of the present invention.

First, the intelligent lighting control method according to the embodiment of the present invention is configured to control an intelligent lighting unit including multiple sensors depending on time, place, scene, environment, or the like, based on the results of sensing by the multiple sensors.

Referring to FIG. 4, the intelligent lighting control apparatus senses the motion or the like of a person or an object within a preset sensing area at step S100. Here, the sensing area corresponds to an area in which the multi-sensor unit 100 included in the intelligent lighting control apparatus is capable of sensing the motion of a person or an object. The multi-sensor unit 100 includes an illuminance sensor, a temperature sensor, an awareness sensor, a color temperature sensor, a voice sensor, or the like so as to detect the motion of a person or an object.

The intelligent lighting control apparatus calculates frequency data using the results of sensing, obtained at step S100, at step S200.

In detail, the multi-sensor unit 100 of the intelligent lighting control apparatus collects respective pieces of raw data from the multiple sensors, extracts sensor information from the raw data, and converts the extracted sensor information into valid data. Here, the sensor information extracted from the raw data includes information extracted by the sensors included in the multi-sensor unit 100, that is, the IDs, dates, times, and measurements of the sensors, the ID of a sensor group including the corresponding sensor, the types, states, and installation places of the sensors, etc. The multi-sensor unit 100 calculates frequency data including the number of detections of the motion of a person or an object based on the valid data.

Next, the intelligent lighting control apparatus accumulates the number of generations of a detection signal using the valid data and a time clock, and calculates the class of lighting type using the cumulative number of generations at step S300. In this case, the number of generations denotes the number of times that the motion of a person or an object is detected by the awareness sensor of the multiple sensors.

The intelligent lighting control apparatus generates a lighting control signal based on the class of lighting type corresponding to the calculated frequency data at step S400. In this case, lighting control signals include a lighting dimming signal required to control the lighting unit 300 so that the brightness of the lighting unit 300 is adjusted in real time and a comfortable environment can be created, a lighting ON signal required to control the lighting unit 300 so that the lighting unit 300 is turned on, and a lighting OFF signal required to control the lighting unit 300 so that the lighting unit is turned off.

The intelligent lighting control apparatus controls the lighting unit 300 in response to the control signal, generated at step S400, at step S500.

Then, the step S100 of sensing the sensing area and the step S200 of calculating the frequency data in the intelligent lighting control method will be described in detail with reference to FIG. 5.

Figure 5:
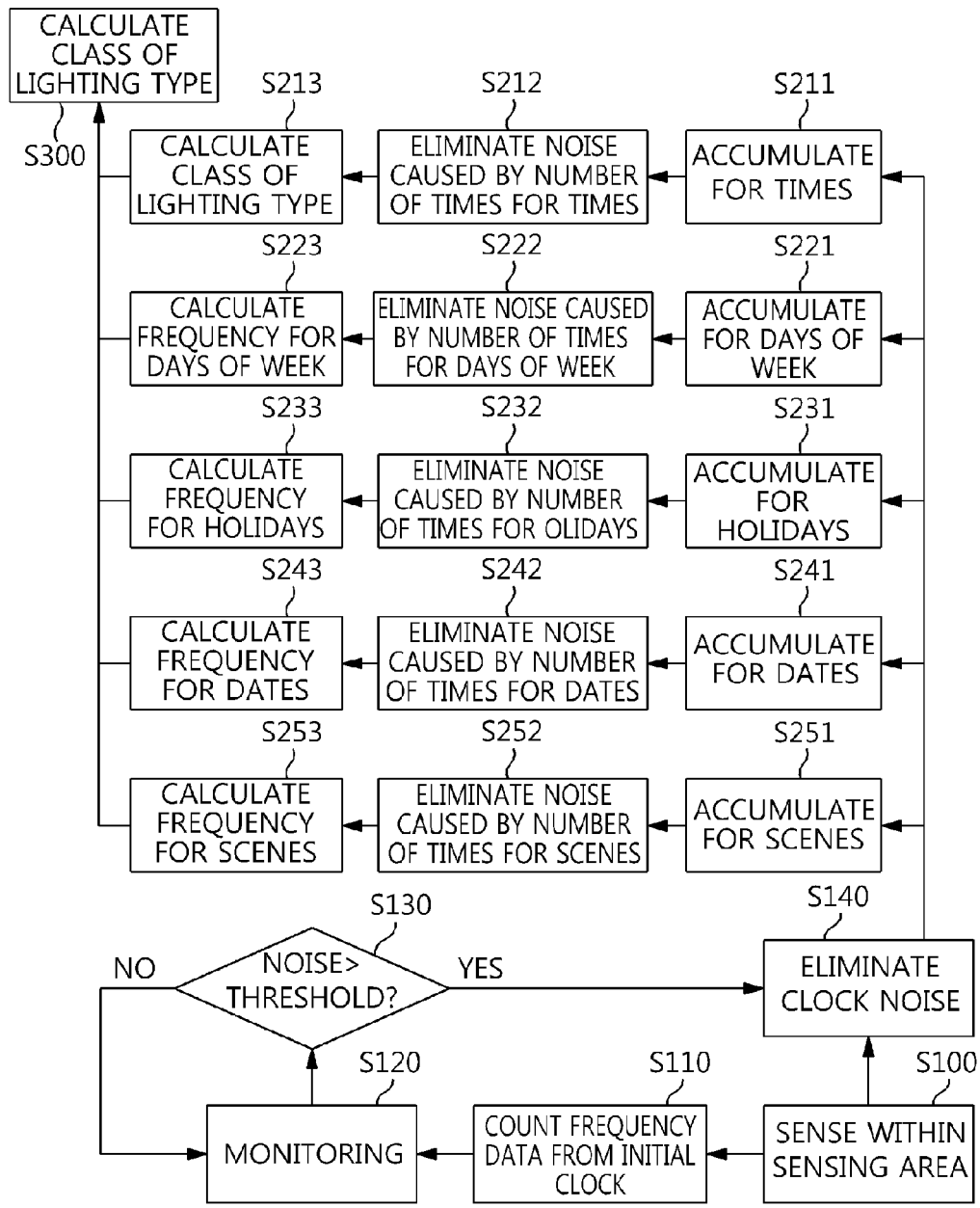
FIG. 5 is a flowchart showing the initial step of the intelligent lighting control method according to an embodiment of the present invention.

FIG. 5 is a flowchart showing in detail the initial step of the intelligent lighting control method according to an embodiment of the present invention.

Referring to FIG. 5, the intelligent lighting control apparatus senses the motion or the like of a person or an object within a set sensing area at step S100.

If the motion of the person or the object is detected at step S100, the intelligent lighting control apparatus checks a clock and starts to count frequency data from an initial clock at step S110. Here, the clock corresponds to a Real Time Clock (RTC).

Next, the intelligent lighting control apparatus performs clock monitoring for a preset time by counting the data from the initial clock at step S120. As a result of performing clock monitoring at step S120, the intelligent lighting control apparatus determines, for example, whether noise contained in the clocks generated during clock monitoring is greater than a threshold at step S130. If the noise is equal to or less than the threshold, the intelligent lighting control apparatus continuously performs clock monitoring.

In contrast, if the noise is greater than the threshold, the intelligent lighting control apparatus eliminates the noise from the clocks at step S140. Here, the noise is a value input due to abnormal operation or bulky data.

Figure 6:
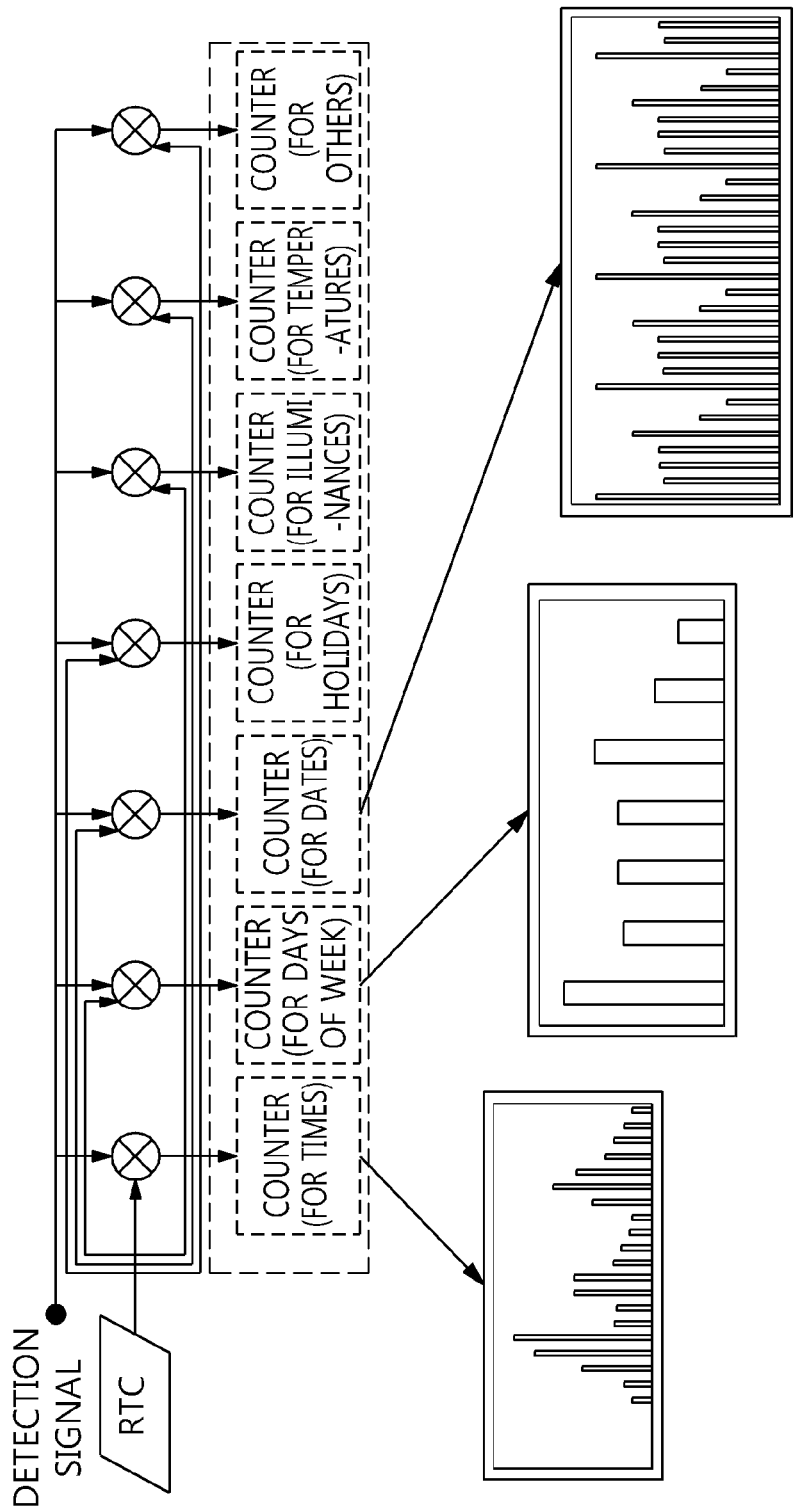
FIG. 6 is a reference diagram showing frequency data according to an embodiment of the present invention.

Next, the intelligent lighting control apparatus calculates pieces of frequency data for respective times, days of the week, holidays, dates, and scenes from the results of sensing at step S100 using the noise-eliminated clocks at step S200. Here, the frequency data may be represented, as shown in FIG. 6. Referring to FIG. 6, the frequency data may be provided in the form of graphs to a user, but it is not limited thereto.

Then, the step S200 of calculating the pieces of frequency data for respective times, days of the week, holidays, dates, and scenes is described in detail.

The intelligent lighting control apparatus accumulates pieces of raw data collected from the multiple sensors for respective times, days of the week, holidays, dates, and scenes based on the counted frequency data at steps S211, S221, S231, S241, and S251. Next, the intelligent lighting control apparatus eliminates noise corresponding to the erroneous cumulative number of times from the pieces of raw data accumulated for respective times, days of the week, holidays, dates, and scenes at steps S212, S222, S232, S242, and S252. The intelligent lighting control apparatus calculates pieces of frequency data for respective times, days of the week, holidays, dates, and scenes using the raw data from which the noise corresponding to the erroneous cumulative number of times is eliminated at steps S213, S223, S233, S243, and S253.

The intelligent lighting control apparatus calculates the class of lighting type using the pieces of frequency data for respective times, days of the week, holidays, dates, and scenes, generated at step S200, at step S300.

Below, the step S300 of calculating the class of lighting type and the step S400 of generating a control signal in the intelligent lighting control method will be described in detail with reference to FIG. 7.

Figure 7:
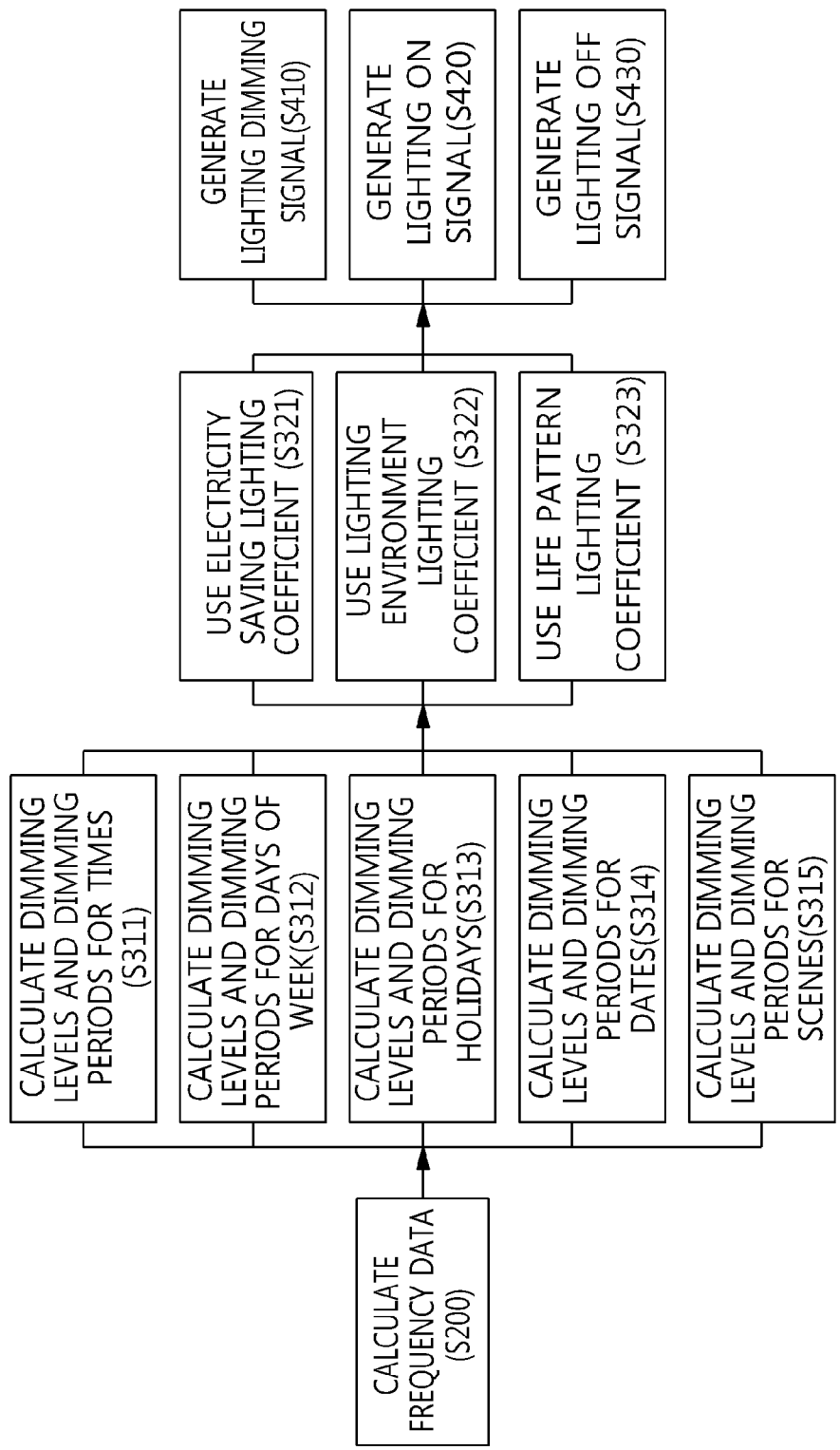
FIG. 7 is a flowchart showing the step of calculating the classes of lighting type in the intelligent lighting control method according to an embodiment of the present invention.

FIG. 7 is a flowchart showing the step of calculating the class of lighting type in the intelligent lighting control method according to an embodiment of the present invention.

Referring to FIG. 7, the intelligent lighting control apparatus calculates frequency data using the results of sensing the motion or the like of a person or an object within the set sensing area at step S200. At step S200, the intelligent lighting control apparatus calculates pieces of frequency data for respective times, days of the week, holidays, dates, and scenes.

The intelligent lighting control apparatus calculates dimming levels and dimming periods corresponding to the frequency data, calculated at step S200, at steps S311, S312, S313, S314, and S315. Here, the dimming levels correspond to the states of an environment created by lighting, and the dimming periods correspond to periods during which a comfortable environment is created by lighting.

The intelligent lighting control apparatus uses lighting coefficients for lighting environment standard depending on the calculated dimming levels and dimming periods at steps S321, S322, and S323. In this case, the lighting coefficients for lighting environment standard may be set depending on environmental conditions, such as electricity saving, a lighting environment, and a life pattern which may be standards of the lighting environment. Such lighting coefficients representatively include an electricity saving lighting coefficient, a lighting environment lighting coefficient, and a life pattern lighting environment, etc.

In FIG. 7 according to an embodiment of the present invention, it is assumed that an electricity saving lighting coefficient is used.

Then, the intelligent lighting control apparatus generates a lighting dimming signal, a lighting ON signal, and a lighting OFF signal so that energy can be saved based on the electricity saving lighting coefficient at steps S410, S420, and S430.

Next, an example in which frequency data is calculated for each scene in which a lighting unit is located using a Real Time Clock (RTC) will be described in detail with reference to FIG. 8.

Figure 8:
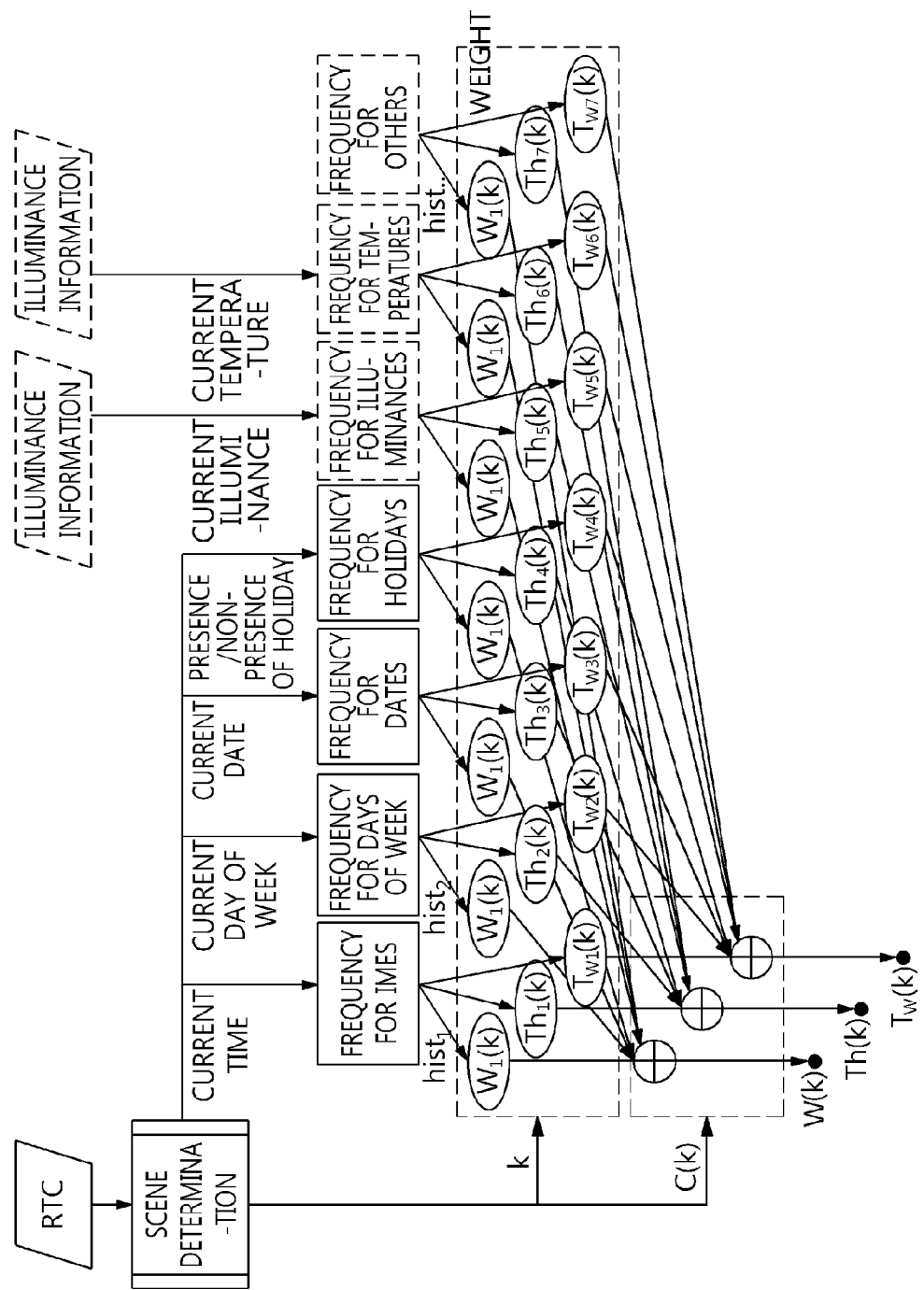
FIG. 8 is a reference diagram showing an example of calculation of pieces of frequency data for respective scenes according to an embodiment of the present invention.

FIG. 8 is a reference diagram showing an example in which frequency data is calculated for each scene according to an embodiment of the present invention.

Referring to FIG. 8, the determination of scenes may be performed by previously setting scene determination values and inputting the values to the intelligent lighting control apparatus.

For example, the types of scene determination may be set to "slack," "complex," etc., and may be set so that they are supported in various types such as one or two, or four to N, for various respective product classes of sensors.

The intelligent lighting control apparatus calculates frequency data based on the results of sensing the motion of a person or an object within the sensing area.

For example, the intelligent lighting control apparatus may classify frequency data corresponding to the number of detections of a human body for respective times, days of the week, or holidays. Further, when even illuminance information or temperature information is provided through an illuminance sensor or a temperature sensor, the intelligent lighting control apparatus may calculate frequency data for scenes by combining the frequency data with various types of sensor information for respective illuminances or temperatures. The frequency data may include, for example, a window size $W(k)$, a detect threshold $Th(k)$ required to turn on the lighting unit when a person is detected, and a duration $T_w(k)$ required to continuously turn on the lighting unit, where k denotes a scene identification variable.

Further, the intelligent lighting control apparatus may set weights using the window size $W(k)$, the detect threshold $Th(k)$ required to turn on the lighting unit when a person is detected, and the duration $T_w(k)$ required to continuously turn on the lighting unit. Here, the window size $W(k)$ may be defined as time.

The window size $W(k)$, the detect threshold $Th(k)$ required to turn on the lighting unit when a person is detected, and the duration $T_w(k)$ required to continuously turn on the lighting unit are calculated by the following Equations (1), (2), and (3:

$$W(k)=c_1 w_1 \text{hist}_1 + c_2 w_2 \text{hist}_2 + \ldots + c_n w_n \text{hist}_n \quad (1)$$

$$Th(k)=c_1 Th_1 \text{hist}_1 + c_2 Th_2 \text{hist}_2 + \ldots + c_n Th_n \text{hist}_n \quad (2)$$

$$T_w(k)=c_1 T_{w1} \text{hist}_1 + c_2 T_{w2} \text{hist}_2 + \ldots + c_n T_{wn} \text{hist}_n \quad (3)$$

Referring to FIGS. 1 to 3, c denotes an optimal constant corresponding to each scene. Further, hist denotes the cumulative number of times that frequency data for each scene is accumulated.

The weights are the most important factors in determining scenes, the values thereof are set using self-experiments, and various theories for searching for optimal weights, such as a Computational Intelligence (CI) algorithm, a neural network, a genetic algorithm, or a fuzzy theory, may be used.

Below, a method of controlling intelligent lighting using an infrared sensor will be described in detail with reference to FIG. 9.

Figure 9:
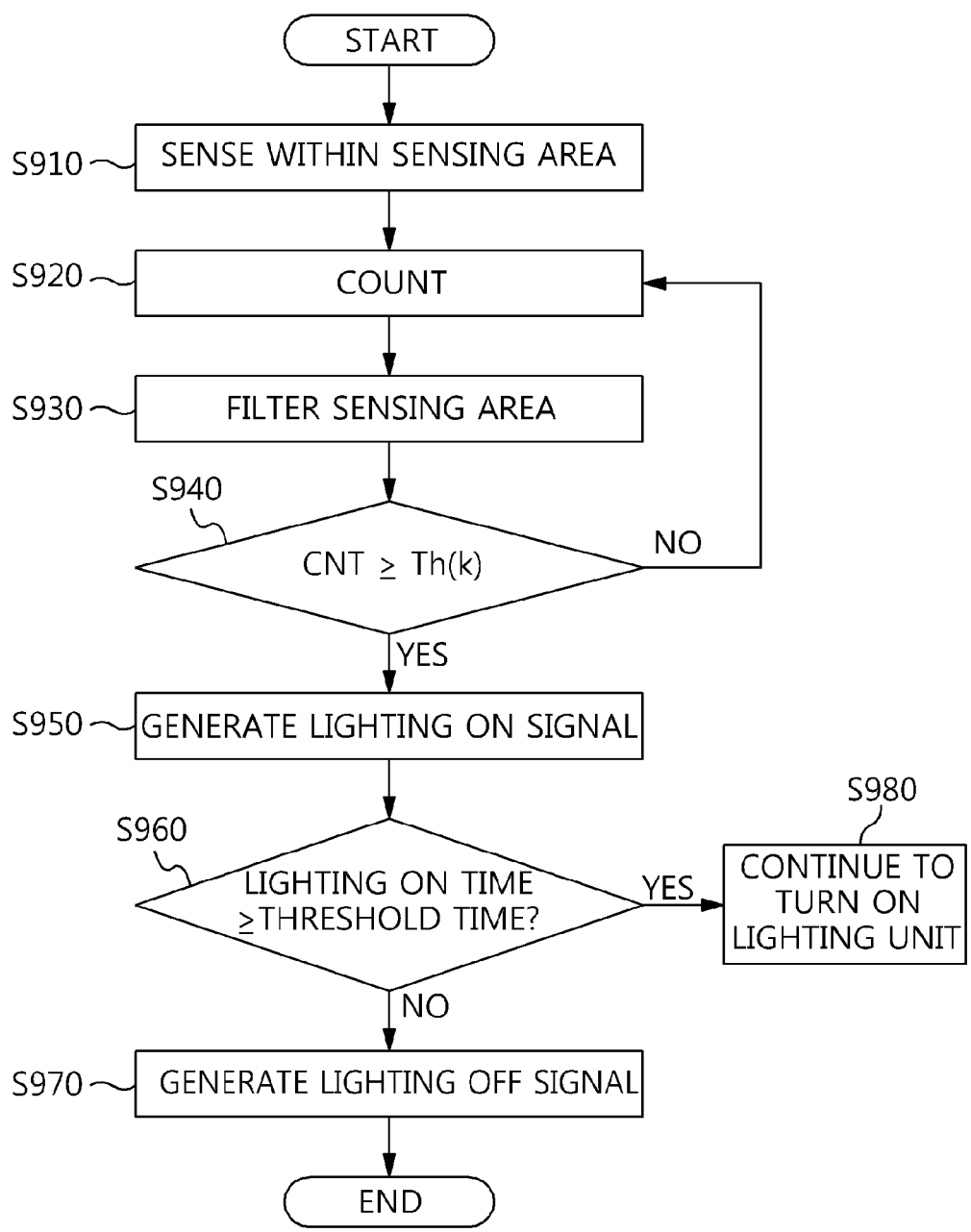
FIG. 9 is a flowchart showing a method of controlling intelligent lighting using an infrared sensor according to an embodiment of the present invention.

FIG. 9 is a flowchart showing a method of controlling intelligent lighting using an infrared sensor according to an embodiment of the present invention.

An intelligent lighting control apparatus includes a multi-sensor unit 100, a lighting control unit 200, and a lighting unit 300.

Referring to FIG. 9, the intelligent lighting control apparatus senses the motion of a person or an object within a set sensing area at step S910. In this case, the multi-sensor unit 100 in the intelligent lighting control apparatus includes an infrared sensor, and the sensing area corresponds to an area in which the infrared sensor (e.g., a Pyroelectric Infrared Radial (PIR) sensor) may sense the motion of a person or an object.

The intelligent lighting control apparatus counts pieces of frequency data based on the results of sensing by the infrared sensor at step S920. In detail, the intelligent lighting control apparatus is configured to, when the infrared sensor detects the motion of a person or an object, generate detection triggers corresponding to the frequency data and count the number of detection triggers. The frequency data according to the embodiment of the present invention may include, not only the number of detection triggers, but also a window size W(k), a detect threshold Th(k) required to turn on the lighting unit when a person is detected, and a duration $T_w(k)$ required to continuously turn on the lighting unit, where k denotes a scene identification variable.

The intelligent lighting control apparatus filters the window size W(k) in correspondence with a current scene because the value of the window size differs according to the scene at step S930.

The intelligent lighting control apparatus determines whether the number of detection triggers (cnt) in the window size is equal to or greater than the detect threshold Th(k) required to turn on the lighting unit at step S940. If it is determined that the number of detection triggers (cnt) in the window size is less than the detect threshold Th(k) required to turn on the lighting unit, the number of detection triggers is reset, and the frequency data is counted again.

In contrast, if it is determined that the number of detection triggers (cnt) in the window size is equal to or greater than the detect threshold Th(k) required to turn on the lighting unit, the intelligent lighting control apparatus generates a lighting ON signal required to control the lighting unit 300 so that the lighting unit 300 is turned on at step S950.

The intelligent lighting control apparatus determines whether lighting ON time $T_{on}$ during which the lighting unit is turned on in response to the lighting ON signal is equal to or longer than a set threshold time, that is, the duration $T_w(k)$, at step S960. The intelligent lighting control apparatus is configured to, if it is determined that the lighting ON time $T_{on}$ is shorter than the set threshold time, generate a lighting OFF signal required to control the lighting unit 300 so that the lighting unit 300 is turned off at step S970. In contrast, if the lighting ON time $T_{on}$ is equal to or longer than the threshold time, the intelligent lighting control apparatus continues to turn on the lighting unit at step S980.

Below, a method of controlling an intelligent lighting unit located at a specific bus stop based on the method of controlling intelligent lighting using the infrared sensor as shown in FIG. 9 will be described in detail with reference to FIG. 10.

Figure 10:
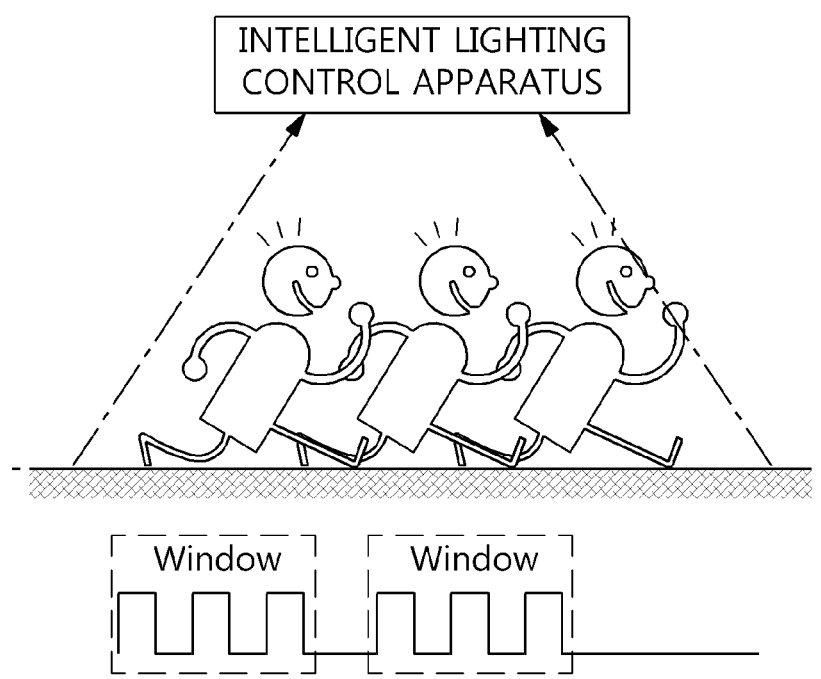
FIG. 10 is a reference diagram showing a method of controlling an intelligent lighting unit located at a bus stop according to an embodiment of the present invention.

FIG. 10 is a reference diagram showing a method of controlling an intelligent lighting unit located at a bus stop according to an embodiment of the present invention.

First, it is assumed that, in an embodiment of the present invention, a PIR sensor is installed at the bus stop, and a current date and time is 8 a.m. on Monday, June 25.

It is assumed that the cumulative number of pieces of frequency data corresponding to last 8 a.m. is 300, the cumulative number of pieces of frequency data calculated on the last Monday (one week ago) is 3500, and the cumulative number of pieces of frequency data calculated on the 25th of last month (one month ago) is 2300. In this case, June 25 is not a holiday.

In such a case, the intelligent lighting control apparatus can recognize, using Equations (1) and (2), that the scene of the bus stop is complex. Here, the complex scene (complexity) is defined as indicating a high frequency in a narrow window. For example, complexity may be a frequency of 10 or more per second in a window size.

For example, the window size W(k) is calculated as about 0.465 seconds (465 ms) as follows.

The window size may be obtained as "W (complexity)=1/3600 seconds (time)*3(window size*constant) *300(frequency data cumulative number)+1/(3600*24 seconds)(day)*5(window size*constant)*3500(frequency data cumulative number)+1/(3600*24 seconds)(day)*0.5(window size*constant)*2300(frequency data cumulative number)+1*1*0(influence on illuminance/temperature)", by using Equation (1).

Further, the detect threshold Th(k) required to turn on the lighting unit when a person is detected may be obtained as "Th(complexity)=1/3600 seconds (time)*35(number of detection triggers*constant)*300(frequency data cumulative number)+1/(3600*24 seconds)(day)*52(number of detection triggers*constant)*3500(frequency data cumulative number)+1/(3600*24 seconds)(day)*0.5(number of detection triggers*constant)*2300(frequency data cumulative number)+1*1*0(influence on illuminance/temperature)," by using Equation (2).

Therefore, at the bus stop such as that of FIG. 10, the lighting unit is turned on in response to the lighting ON signal output from the intelligent lighting control apparatus when frequency data is measured 5.15 times or more within a window of 465 ms.

In this way, the present invention may provide different lighting environments to the user depending on the temporal, spatial, scene, and environmental conditions of a place where the lighting unit is located.

In accordance with the present invention, there is an advantage in that the intelligent lighting control apparatus and method may provide different lighting environments to users depending on the temporal, spatial, scene, and environmental conditions of a place where a lighting unit is installed.

Further, the present invention is advantageous in that sensors are integrated into a lighting unit, so that the installation of the lighting control apparatus is facilitated, cost is reduced, and maintenance is conveniently performed, and in that lighting is controlled using sensors, and thus the saving of energy is maximized.

Furthermore, the present invention is advantageous in that sensors are individually combined and integrated into a lighting unit, so that sensor functions may be combined and provided in conformity with a user's selection, thus enabling a user-customized multi-sensor function to be provided.

Furthermore, the present invention is advantageous in that the information of sensors is collected, the usage form of lighting is analyzed, and lighting is controlled in consideration of the usage form, thus saving electricity, preventing the malfunctioning of lighting, and improving a user's convenience.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An intelligent lighting control method comprising:
    sensing, by an intelligent lighting control apparatus including multiple sensors, motion of a person or an object within a set sensing area using the multiple sensors;
    converting results of sensing into valid data, and calculating frequency data using the valid data;
    calculating a class of lighting type based on the valid data; and
    controlling an operation of a lighting unit based on a class of lighting type corresponding to the frequency data.

2. The intelligent lighting control method of claim 1, wherein the multiple sensors include at least one of an illuminance sensor, a temperature sensor, an awareness sensor, a color temperature sensor, and a voice sensor.

3. The intelligent lighting control method of claim 1, wherein calculating the class of lighting type comprises:
    calculating dimming levels and dimming periods for respective times, days of a week, holidays, dates, and scenes based on the valid data; and
    calculating the class of lighting type based on the dimming levels and the dimming periods.

4. The intelligent lighting control method of claim 1, wherein calculating the frequency data comprises:
    collecting raw data using the results of the sensing;
    extracting sensor information from the raw data; and
    converting the sensor information into the valid data.

5. The intelligent lighting control method of claim 1, wherein controlling the operation of the lighting unit is configured to control the operation of the lighting unit using an electricity saving lighting coefficient, a lighting environment lighting coefficient, or a life pattern lighting coefficient depending on the class of lighting type.

6. An intelligent lighting control apparatus for controlling a lighting unit, comprising:
    a multi-sensor unit including multiple sensors, the multi-sensor unit being configured to detect motion of a person or an object within a set sensing area using at least one of the multiple sensors; and
    a lighting control unit configured to accumulate a number of times at which the motion is detected by the multi-sensor unit, calculate a class of lighting type using the accumulated number, and control an operation of the lighting unit based on the accumulated number and the class of lighting type.

7. The intelligent lighting control apparatus of claim 6, wherein the multi-sensor unit comprises:
    a sensor unit including at least one of an awareness sensor, a temperature sensor, an illuminance sensor, a color temperature sensor, and a voice sensor;
    a signal processing unit for converting results of sensing by the sensor unit into a sensing signal;
    a sensor data detection unit for collecting raw data based on the sensing signal, extracting sensor information from the raw data, and converting the sensor information into valid data;
    a sensor data analysis unit for selecting a sensor control algorithm based on the valid data; and
    a sensor control unit for controlling the sensor unit based on the sensor information and the sensor control algorithm.

8. The intelligent lighting control apparatus of claim 7, wherein the sensor information includes Identifications (IDs), dates, times, and measurements of the sensors, ID of a sensor group including a corresponding sensor, and types, states, and installation places of the sensors.

9. The intelligent lighting control apparatus of claim 6, wherein the lighting control unit controls the operation of the lighting unit using an electricity saving lighting coefficient, a lighting environment lighting coefficient, or a life pattern lighting coefficient depending on the class of lighting type.

10. The intelligent lighting control apparatus of claim 9, wherein the lighting control unit is configured to, when the electricity saving lighting coefficient is used, generate a lighting dimming signal, a lighting ON signal, and a lighting OFF signal based on the electricity saving lighting coefficient, and control the operation of the lighting unit in response to the generated signals.

* * * * *